(12) United States Patent
Wilkinson

(10) Patent No.: X2629
(45) Date of Patent: Jul. 3, 1816

(54) LOOM, REEDS, MACHINE FOR MAKING

(76) Inventor: Jeptha A. Wilkinson

Jeptha A. Wilkinson
Letters Patent

The Schedule referred to in these Letters Patent and making part of the
same containing a description in the words of the said Jeptha A Wilkin
son himself of his machine for Manufacturing Weavers Reeds Heddles or
Harness

---

This machine has three principle powers or motions derived from one
main shaft, two of which give two other additional powers or motions
all of which execute the following parts in regular succession viz.
feeding, placing, cutting, gaging and winding the Reed Heddle, or
Harness. which is done by one revolution of the main shaft. The main
shaft has three agents placed upon it two of which are wheels one third
of whose circumference are set with cogs. the other is a circular cam
or wedge which operates upon a lever that throws the flier forward which
cuts the split and presses and confines it to its proper place until wound
by the flier receiving a circular motion from one of the wheels on the main
shaft. The flier is an instrument the Bowles or wings of which are
extended sufficiently to admit of a bobbin filled with yarn. within its
circumference it has a shaft extending from each end on a line with
the centre of sufficient magnitude to admit of a hole through the centre
on a line from end to end of sufficient size to give passage to the Ribbs
which it winds and to admit of wheels on the body by which it is
governed and bearings by which it is held to its proper place in the
machine. the foot of the flier is the end and part which enters, cuts
and presses the split and winds it firmly to its station, the foot of the
flier has a passage nearly the length of its body, entering on the outside
and running parallel with the main passage of the ribbs and coming
out at the point through which the yarn discharges itself upon the ribbs,
the point of the flier cuts the split by being pressed forward on the ribbs
past the throat or passage of the split to the ribbs in a piece of metal made
to fit the circumference of the flier. the same motion presses the split to its proper place between the ribbs at the same instant the flier takes a
circular motion and lays the yarn round the body of the ribbs and con-
fines the split. Description of process. on turning the main shaft the
first cog immediately engages the feeding apparatus and introduc-
es the split and conducts it to its place at the same instant the kam
or wedge on the main shaft is brought to bear upon the lever which shoots
the fliers ahead onto the split and presses it to its proper station between
the ribbs and continues to hold the fliers in that position untill the
second cog on the main shaft engages with other machinery which
both gives motion to the fliers and carriage at the same instant thus
by passing the yarn round the ribbs which are passed on a regular degree
by the carriage which governs them after which the fliers are forced back
by a spring which gives reception to a succeeding split.
Application of Materials and mode of Operation. 1st The bobbins are
filled with yarn and placed in the body of the machine. 2nd The Ribbs
or reed which forms a component part of the Reed, Heddle or Harness
are introduced to the barrell of the flier in the machine and passed through
both flier and bobbin which lays in the flier and is confined to one
end of the carriage and the other end to the other and tightly drawn by
a screw in order to stand the operation of the machine after which
the yarn is taken from the Bobbin passed over the proper conductor
attached to the wings or body of the flier down through the passage in
the foot of the flier to the Ribbs to which it is made fast.
3d The wire or splits are introduced. 4th the main shaft is put in mo-
tion the first cog of which immediately advances the split introduc
es and places it in its proper station or position for cutting.
5th The kam or wedge at the same instant engages the lever which
shoots the fliers forward onto the split and instantly presses it to
its final place. 6th The second wheel then comes in contact with
the twisting machinery which gives a circular motion to the fliers
at ~~at~~ the same instant the fliers commence their revolution the carriage
commences graduation and forces the ribbs on their proper degree by the
time the fliers have completed their revolution, the fliers while turning
[illegible]

stand in a fixed position while the ribbs are gradually passing through them. 7th At the same instant the fliers complete their revolution they are thrown back by the power of a spring which places them in a position to give reception to a succeeding split. Each part of this machine performing the several motions of feeding cutting gaging or or graduating and winding the Reed Harness or Heddle, may be moved by either of the mechanical powers in different forms and regulated by different cams and the whole collectively or singly may be put in motion and worked by any power whatever that is capable of turning a wheel and governing a crank. And the flier is applicable to and capable of winding or covering with thread yarn or any other material that can be used in that capacity, any substance either of wood, wire, twine, cordage or any other material of length and equal size that can bear the operation of the machinery or flier when passing through its body in regular progression with the revolution of the Reel.

Witnesses
Geo Hadfield
A. M. Barnum

J. A. Wilkinson

[illegible]
[illegible]

(1014 Words)